United States Patent
Bruns et al.

(10) Patent No.: US 10,913,455 B2
(45) Date of Patent: Feb. 9, 2021

(54) METHOD FOR THE IMPROVED DETECTION OF OBJECTS BY A DRIVER ASSISTANCE SYSTEM

(71) Applicant: AUDI AG, Ingolstadt (DE)

(72) Inventors: Erich Bruns, Ingolstadt (DE); Christian Jarvers, Augsburg (DE)

(73) Assignee: Audi AG, Ingolstadt (DE)

( * ) Notice: Subject to any disclaimer, the term of this patent is extended or adjusted under 35 U.S.C. 154(b) by 231 days.

(21) Appl. No.: 16/314,595

(22) PCT Filed: Jun. 23, 2017

(86) PCT No.: PCT/EP2017/065563
§ 371 (c)(1),
(2) Date: Mar. 29, 2019

(87) PCT Pub. No.: WO2018/007171
PCT Pub. Date: Jan. 11, 2018

(65) Prior Publication Data
US 2020/0384989 A1 Dec. 10, 2020

(30) Foreign Application Priority Data
Jul. 6, 2016 (DE) .................. 10 2016 008 218

(51) Int. Cl.
*B60W 30/095* (2012.01)
*G06K 9/62* (2006.01)
(Continued)

(52) U.S. Cl.
CPC ..... *B60W 30/0956* (2013.01); *G06K 9/00818* (2013.01); *G06K 9/6259* (2013.01);
(Continued)

(58) Field of Classification Search
None
See application file for complete search history.

(56) References Cited

U.S. PATENT DOCUMENTS

| 7,046,822 B1 | 5/2006 | Knoeppel et al. |
| 2008/0069437 A1* | 3/2008 | Baker .................. G06K 9/6256 382/159 |

(Continued)

FOREIGN PATENT DOCUMENTS

| CN | 103810699 A | 5/2014 |
| DE | 19926559 A1 | 12/2000 |

(Continued)

OTHER PUBLICATIONS

International Search Report and Written Opinion of the International Searching Authority directed to related International Patent Application No. PCT/EP2017/065563, dated Nov. 9, 2017, with attached English-language translation; 24 pages.

(Continued)

*Primary Examiner* — Jonathan M Dager
*Assistant Examiner* — Garrett F Evans
(74) *Attorney, Agent, or Firm* — Sterne, Kessler, Goldstein & Fox P.L.L.C.

(57) ABSTRACT

The disclosure relates to a method for operating a driver assistance system of a motor vehicle. The method includes detecting a first data set of sensor data measured by a sensor device of the driver assistance program. The first data set of sensor data includes missing class allocation information, wherein the class allocation information relates to the objects represented by the sensor data. The method also includes pre-training a classification algorithm of the driver assistance system while taking into consideration the first data set in order to improve the object differentiation of the classification algorithm. The method further includes generating a second data set of simulated sensor data which includes at least one respective piece of class allocation information according to a specific specification. The method also includes training the classification algorithm of (Continued)

the driver assistance system while taking into consideration the second data set in order to improve an allocation assignment of the classification algorithm for objects differentiated by the classification algorithm. The method further includes improving the detection of objects, which are represented by additional measured sensor data, by the driver assistance system.

10 Claims, 1 Drawing Sheet

(51) Int. Cl.
    *G06K 9/00*     (2006.01)
    *G06N 3/08*     (2006.01)
    *G06N 3/04*     (2006.01)

(52) U.S. Cl.
    CPC ......... *G06K 9/6262* (2013.01); *G06K 9/6289* (2013.01); *G06N 3/04* (2013.01); *G06N 3/08* (2013.01); *B60W 2420/42* (2013.01); *B60W 2420/54* (2013.01); *B60W 2554/80* (2020.02)

(56) References Cited

U.S. PATENT DOCUMENTS

| | | |
|---|---|---|
| 2011/0184895 A1 | 7/2011 | Janssen |
| 2012/0083960 A1* | 4/2012 | Zhu .............. G05D 1/0276 701/23 |
| 2017/0039469 A1* | 2/2017 | Majumdar .......... G06N 3/0445 |
| 2017/0180723 A1 | 6/2017 | Chanussot et al. |

FOREIGN PATENT DOCUMENTS

| | | |
|---|---|---|
| DE | 102008001256 A1 | 10/2009 |
| DE | 102013012781 A1 | 2/2015 |
| DE | 102013018543 A1 | 5/2015 |
| DE | 102014106506 A1 | 11/2015 |
| EP | 2402827 A1 | 1/2012 |
| WO | WO-2015/014873 A1 | 2/2015 |

OTHER PUBLICATIONS

Chen, Tairui et al., "Road Marking Detection and Classification Using Machine Learning Algorithms," 2015 IEEE Intelligent Vehicles Symposium IV, Jun. 28-Jul. 1, 2015, COEX, Seoul, Korea; 6 pages.
International Preliminary Report on Patentability directed to related International Patent Application No. PCT/EP2017/065563, dated Jun. 26, 2018, with attached English-language translation; 12 pages.

* cited by examiner

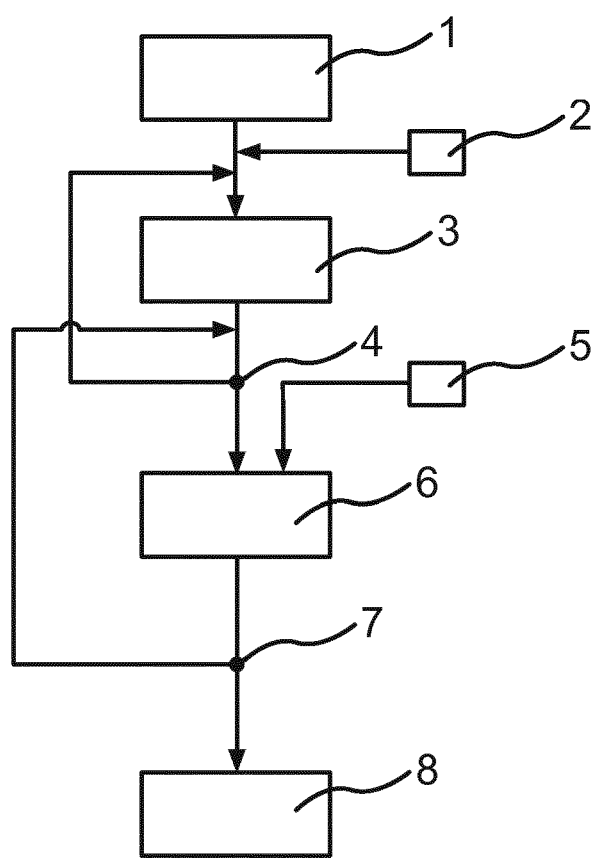

METHOD FOR THE IMPROVED DETECTION OF OBJECTS BY A DRIVER ASSISTANCE SYSTEM

TECHNICAL FIELD

The disclosure relates to a method for operating a driver assistance system of a vehicle in order to improve the detection of objects by the driver assistance system.

BACKGROUND

In modern motor vehicles, many functions of driver assistance systems for piloted, i.e. autonomous or partially autonomous driving, are based on machine learning. To train the respective driver assistance system, correspondingly large data quantities or data sets are necessary. Virtually created, i.e. simulated, data or sensor data represent a comprehensive alternative to the otherwise necessary manual preparation of recorded, i.e. measured, real data or sensor data convenient for machine learning. Moreover, manual preparation or generation of data can hardly be utilized for some target data or target scenarios, e.g. a curve in the road. However, simulated data may differ systematically from real or measured data due to imperfections in the underlying simulation process. An algorithm or classification algorithm, which is exclusively trained with simulated data, will therefore show a reduced performance on real data when being applied, i.e. when being used or utilized to detect objects, which are represented by the sensor data. The utility of the simulated data for improving the corresponding algorithms via machine learning is thereby adversely affected.

In this context, DE 10 2013 012 781 A1 discloses a method for training an algorithm to detect predetermined patterns in image data, which are generated using a camera of a motor vehicle.

DE 10 2013 018 543 discloses a driver assistance system for a motor vehicle with a recording unit, a computation unit and a reproduction unit. The computation unit is provided to interpret data from the recording unit and also utilizes a learning algorithm.

DE 10 2014 106 506 A1 discloses a method for performing diagnostics on a camera system of a motor vehicle, wherein a detected vehicle-external object is classified in two different ways and the respective classification results are compared to perform the diagnostics.

BRIEF DESCRIPTION OF THE DRAWINGS/FIGURES

FIG. 1. Illustrates a schematic flow chart of a method for the improved detection of objects by a driver assistance system, according to some embodiments.

DETAILED DESCRIPTION

This results in the effect of improving the detection of objects, which are represented by measured sensor data, by a driver assistance system of a motor vehicle, i.e. increasing a corresponding recognition rate of the driver assistance system in particular.

This effect is achieved by the subject-matter of the independent claim. Advantageous embodiments result from the independent claims, the description and the FIGURE.

The disclosure relates to a method for operating a driver operating system of a motor vehicle. The method comprises a series of steps.

One step is detecting a first data set of sensor data which is measured by a sensor device of the driver assistance system, i.e. real sensor data, and which comprises missing class allocation information or in particular does not comprise class allocation information. The first data set thus comprises a number of measured sensor data. The sensor data each have a missing or no class allocation information. The class allocation information, which may also be designated as a so-called "label," relates to the objects represented by the sensor data. In particular, these objects may be vehicle-external objects or driving situations. A label can indicate, for example, that an object represented in the sensor data is a road sign. It may also contain further information and determine an image region, for example, in which the corresponding object, here the road sign, is arranged. A possible label for sensor data of a camera can be for example: "yield sign in the upper right quadrant of the image."

A next step is pre-training a classification algorithm of the driver assistance system while taking into consideration the first data set in order to improve the object differentiation of the classification algorithm. In particular, this pre-training may also be performed by a steering device of the driver assistance system. The objective thereof is to learn a representation that is meaningful and stable with regard to the statistic properties of the data. An example is finding edges and object boundaries. A representation learned in the pre-training may thus be a basic geometric shape, for example, a circle, a triangle or the like. In the aforementioned example of a road sign, a representation for the road sign could thus be learned through the basic shape "triangle" or "downwards-pointing triangle." This is helpful for the later training, for example, when the meaning of objects such as road signs are to be detected. The objective thereof is to learn a method of representation or multiple representation possibilities for objects in the sensor data by the classification algorithm.

A further step is generating a second data set of simulated, i.e. virtual, sensor data which comprises at least one respective piece of class allocation information according to a specified specification. A subsequent further step is training the classification algorithm of the driver assistance system while taking into consideration the second data set in order to improve an allocation assignment or allocation classification of the classification algorithm, in particular for objects differentiated, i.e. classified or to be classified, by the classification algorithm. The training thus takes place after the pre-training is completed, i.e. has been performed at least once. The objective thereof is to learn a target effect specified by the class allocation information for the various objects, e.g. to learn the meaning of a determined road sign or a distance, which can be deduced, for example, from the knowledge of regulated standard sizes of road signs. Thus, the representation of an object, e.g. the aforementioned "downwards-pointing triangle," may be coupled with the meaning "yield." By learning the representation "downwards-pointing triangle" via real data, the later detection rate for such objects in a real surrounding is also particularly high.

All in all, the combination of pre-training and training improves detecting or classifying objects, which are represented by additional measured sensor data, which are analyzed after training using the classification algorithm, by the driver assistance system. In other words, a classification region of the classification algorithm is expanded and/or refined by the combination of pre-training and training. This may be checked by measuring a detection rate of the classification algorithm and comparing this with the detection rate of corresponding known classification algorithms.

The method may also comprise the step of detecting objects, which are represented by additional measured, i.e. real, sensor data, by the driving system of the motor vehicle using the classification algorithm.

This has the advantage that solutions, i.e. structures and/or weightings, for the classification algorithm can be found through the influence of the pre-training. These solutions are better generalized based on real data. Thus, the object differentiation in the classification algorithm is included in the classification algorithm by the pre-training such that the classification algorithm may better differentiate real objects or those represented by real sensor data. Through the training with simulated data, the allocation assignment of the classification algorithm and possibly also the object differentiation of the classification algorithm may be further refined. Since a good point of departure, i.e. one close to reality, such as starting learning weights, are already set for the training by the pre-training, a specified target task, such as a specified recognition rate for specified scenarios or objects may also be achieved more quickly or precisely with the training than in usual methods.

The combination of pre-training and training according to the disclosure thus optimally combines the advantages of the respectively individual different types of training. Further added value is created here in that the pre-trained classification algorithm is the point of departure for the training. Furthermore, not only may the allocation assignment of the classification algorithm be improved by the training, but object differentiation may additionally be refined. Thus, for example, object differentiation that took place in the pre-training and which can differentiate between round and angular objects can be improved such that round road signs, for example, with various specifications, e.g. various speed specifications, may be classified as a variable object. All in all, a classification algorithm is created, which may better recognize objects represented in real sensor data with decreased time and financial investment while simultaneously being trainable in nearly any manner.

In some embodiments, the measured and/or simulated sensor data include image data and/or distance data, in particular radar data and/or ultrasound data, and/or acoustic data, in particular within the audible range for humans, and/or vehicle-internal sensor data, in particular a speed and/or tire and/or motor revolution speed and/or a lateral and/or transverse acceleration or the like. This results in the advantage that objects, which are in particular vehicle-external objects or comprise such objects, may be recognized in a particularly reliable manner.

In some embodiments, the pre-training, and in particular also the detecting, takes place repeatedly and/or the training, and in particular also the generating, takes place repeatedly. The mentioned method steps may therefore be carried out iteratively. Both the pre-training and the training may take place repeatedly one time after another, and the pre-training may also take place again after one or more training steps. This has the advantage that a specified quality, e.g. a specified recognition rate of the classification algorithm, may thus easily be achieved. Moreover, a respective interim or end status of the algorithm may be recorded by determining the quality, e.g. the recognition rate, and the respective other training may be resorted to, i.e. after training to pre-training or after pre-training to training, in case of an unsatisfactory development, e.g. a worsened recognition rate. Possible unlearning may also be avoided in this way.

In some embodiments, the classification algorithm is provided for recognizing or classifying objects and/or driving situations while driving by the driver assistance system. The recognized objects may thus be both vehicle-external objects and driving situations or scenarios while driving. The objects to be recognized may, for example, be vehicles or objects such as road signs or a lane marker. This has the advantage that the driver assistance device can support a driver of the corresponding motor vehicle particularly well.

It may furthermore be provided that the pre-training takes place before the training. In particular, it may take place at least once or exclusively before the training. This has the advantage that the classification algorithm, which must function with real sensor data, may be directed in the subsequently desired direction at an early stage. Developing an unrealistic object division through the training of the classification algorithm may thus be prevented.

In some embodiments, the pre-training includes an unmonitored learning process. In particular, the pre-training also does not comprise a monitored learning process. The unmonitored learning process uses deep learning and representation learning algorithms in particular. This has the advantage that the differentiation of objects may be learned without specific assignments needing to be known or specified respectively for the various objects ahead of time. The real sensor data thus does not have to be prepared manually and be provided, for example, through extensive manual work with class allocation information. Thus, a "property-free differentiation" of the classification algorithm, which may differentiate objects based on correlations, may be achieved. The classification algorithm still cannot make declarations or decisions regarding properties relevant for an intervention or the functioning of the driver assistance system, such as a meaning or a distance of an object.

In some embodiments, the training includes a monitored learning process. In particular, the monitored learning process may utilize gradient descent. This has the advantage that a direction may be specified by specifying properties of the corresponding objects as a recognition target for learning. This direction may be specified by the virtual sensor data after detailed specification with minimal manual effort.

In some embodiments, the first data set is expanded or completed with simulated data before the pre-training. This has the advantage that scenarios or objects not contained in the real data may also be taken into consideration during the pre-training. Thus, for example, infrequent, but important events or objects may be artificially added and the effort for detecting the first data set may thereby be reduced. The simulated sensor data preferably do not comprise more than 40, particularly preferably no more than 20 or no more than 10 or 5 percent of the overall sensor data. It can thereby be avoided that imperfections in the simulation process influence the pre-training in a way that worsens the recognition of objects.

In some embodiments, the classification algorithm is based on a neural network. This has the advantage that both the pre-training and the training may be implemented rather easily and there may have recourse to a number of proven unmonitored and monitored learning algorithms. Moreover, a classification or recognition performance that comes close to human sensation and performance may thus be achieved.

It may be provided here that the pre-training only relates to a first portion of the neural network and the training relates to a larger second portion of the neural network or the entire neural network. For example, the first portion may be trained with unmonitored learning methods, such as denoising auto encoder. The larger second portion may be trained, for example, with gradient descent. All of the necessary time investment for training the neural network may thus be reduced without decreasing precision in recognizing objects.

The features and feature combinations mentioned above in the description as well as the features and feature combinations mentioned below in the FIGURE description and/or only shown in the figures can be used not only in the combinations provided, but also in other combinations without leaving the scope of the disclosure. Embodiments of the disclosure may also be comprised and disclosed that are not shown and explained explicitly in the figures, but which may emerge from the explained embodiments and be produced through separate feature combinations. Embodiments and feature combinations may also be disclosed that do not have all of the features of an originally formulated independent claim. Moreover, embodiments and feature combinations may be disclosed, in particular by the embodiments summarized above, which transcend the feature combinations summarized in the references of the claims or which deviate therefrom.

Exemplary embodiments of the disclosure are explained in greater detail below using a schematic drawing. FIG. 1 shows a schematic flow chart of a method for the improved detection of objects by a driver assistance system, according to some embodiments.

In the method shown, a first step is detecting 1 a first data set of sensor data which is measured by a sensor device of the driver assistance system. The sensor data may, for example, be image data of a camera of the motor vehicle, which are transmitted to the driver assistance system. The first data set in the example shown includes only the image data with no further information about the objects in the environment of the motor vehicle represented in the image data. Thus, in the present case, only images are transmitted to the driver assistance system. In a next step, expanding 2, in the present case, simulated sensor data is then added to the first data set in addition to the real measured sensor data. The simulated sensor data also does not have class allocation information on represented objects in the sensor data in the present case, but they could in another embodiment.

A next step here is the pre-training 3 of a classification algorithm of the driver assistance system while taking into consideration the first expanded data set in order to improve the object differentiation of the classification algorithm. This takes place in the present case via an unmonitored learning process and has the goal of learning a representation of the sensor data, which is stable with regard to the statistic properties of the sensor data. Here, the finding of edges and object boundaries can be learned, for example.

After the pre-training 3, a first verification 4 takes place, here of the quality of the classification algorithm, for example through the measurement of the recognition rate. If the algorithm does not satisfy a specified quality criterion, the pre-training 3 is repeated in the present case.

If the algorithm does satisfy the quality criterion, after generating 5 a second data set of simulated sensor data, training 6 of the classification algorithm while taking into consideration the second data set may take place. During generating 5, simulated sensor data are simulated here, each of which has corresponding class allocation information according a specified specification. Thus, a simulated image file is provided, for example, with coordinates of objects represented therein and further information regarding the type and property of the respective objects present in various image areas. This class allocation information is then utilized during training 6 in the shown example via a monitored learning process to improve an allocation assignment of the classification algorithm for objects differentiated by the classification algorithm. In the present case, after the training 6 takes place a second verification 7 of the quality of the classification algorithm. If the quality corresponds to the specified quality criterion, then recognition 8 of objects that are represented in additional sensor data is performed by the driver assistance system in the present case. If the second verification 7 delivers a negative result, the first verification 4 takes place again in the example shown with the known consequences mentioned above, i.e. a repetition of the pre-training 3 if necessary. Alternatively, it may be provided that a negative verification result in the step of the second verification 7 only leads to a repetition of the training 6.

It may also be provided that before a respective repetition of the pre-training 3 or the training 6, detecting 1 or generating 5 of respective data sets that are used for the training correspondingly takes place again.

The invention claimed is:

1. A method for operating a driver assistance system of a vehicle, comprising:
   detecting, by a sensor device of the driver assistance system, a first data set of sensor data, wherein the first data set of sensor data comprises missing class allocation information, the class allocation information relating to an object represented by the sensor data;
   pre-training a classification algorithm of the driver assistance system while taking into consideration the first data set of sensor data in order to improve object differentiation of the classification algorithm, wherein the pre-training comprises an unmonitored learning process;
   generating a second data set of simulated sensor data which comprises at least one respective piece of class allocation information according to a specified specification;
   training the classification algorithm of the driver assistance system while taking into consideration the second data set of simulated sensor data in order to improve an allocation assignment of the classification algorithm for the object differentiated by the classification algorithm, wherein the training comprises a monitored learning process; and
   improving detection of the object, which is represented by additional measured sensor data, by the driver assistance system.

2. The method of claim 1, wherein the sensor data comprise image data, distance data, acoustic data or vehicle-internal sensor data.

3. The method of claim 1, wherein the pre-training and detecting are performed repeatedly, or the training and generating are performed repeatedly.

4. The method of claim 1, further comprising:
   prior to the pre-training, providing the classification algorithm for the detection of the object or driving situations when operating the driver assistance system.

5. The method of claim 1, wherein the pre-training is performed before the training.

6. The method of claim 1, wherein the pre-training comprises an unmonitored learning process, which uses deep learning algorithms or representation learning.

7. The method of claim 1, wherein the training comprises a monitored learning process, which uses gradient descent.

8. The method of claim 1, wherein the first data set of sensor data is expanded before the pre-training with simulated sensor data.

9. The method of claim 1, wherein the classification algorithm is based on a neural network.

10. The method of claim 9, wherein the pre-training only relates to a first portion of the neural network and the training relates to a larger second portion of the neural network or the entire neural network.

* * * * *